United States Patent Office 3,151,168
Patented Sept. 29, 1964

3,151,168
PREPARATION OF ALKALI METAL-BORANE COMPOSITIONS
Albert D. McElroy, Evans City, Pa., and Joseph P. Nigon, Washington, D.C., assignors to Callery Chemical Company, Pittsburgh, Pa., a corporation of Pennsylvania
No Drawing. Filed Mar. 3, 1958, Ser. No. 718,445
6 Claims. (Cl. 260—606.5)

The invention relates to the preparation of new and useful compositions of matter having an empirical composition wherein there are two sodium or potassium atoms for each five boron atoms and as many as fifteen hydrogen atoms in each molecule.

This application is a continuation-in-part of our patent application Serial No. 476,580, filed December 20, 1954.

In 1935 Stock reported the preparation of $K_2B_2H_6$ from diborane ($B_2H_6$) and potassium amalgam (Z. anorg. allgem. Chem. 225, p. 225) (1935). This potassium salt could not be hydrogenated and its hydrolysis products were not completely identified. In 1936 Stock also prepared $Na_2B_2H_6$ and $CaB_2H_6$ (Z. anorg. allgem. Chem. 228, 178) (1936). When heated to 450° C., these salts formed compounds of the type $M_2B_4H_6$ and $M_2B_2H_4$. Treatment with hydrochloric acid or hydrobromic acid either liberated diborane or replaced hydrogen with halogens. In 1935 Stock also reported the formation of $K_2B_5H_9$ from pentaborane-9 ($B_5H_9$) and potassium amalgam. However, X-ray studies by subsequent investigators [(J.A.C.S. 71, 2583) (1949)] have created some doubt as to the identity of this product.

It is a primary object of the present invention to provide new and useful compositions having an empirical composition wherein there are two sodium or potassium atoms for each five boron atoms and as many as fifteen hydrogen atoms in each molecule.

It is a further object of this invention to prepare new compositions having an empirical composition represented by the formulas $Na_2B_5H_{15}$ and $K_2B_5H_{15}$.

Another object is to provide a method by which the foregoing products can be prepared in substantially quantitative yields.

Other objects will become apparent throughout the specification and claims which follow.

This invention is based upon our discovery that four mols of an alkali metal such as sodium or potassium will react with 5 mols of diborane in the presence of a liquid ether of the formula $RO(C_2H_4O)_nR$, where $n$ is an integer from 1 to 4 and R is a lower alkyl radical, to yield 2 mols of $Na_2B_5H_{15}$ or $K_2B_5H_{15}$. The equation for this reaction, using sodium metal, may be expressed as follows:

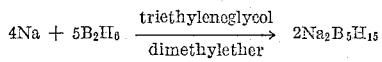

The products are recovered in the solvated form.

The reaction may be carried out at atmospheric, subatmospheric, or superatmospheric pressure. Similarly, ambient temperatures or elevated temperatures may be used, as desired by the operator. Since the products can be decomposed, to evolve diborane, at moderately elevated temperatures, it is preferred to avoid temperatures in the order of 75° C. and above during reaction so that the yield of product is not adversely affected.

The reaction is carried out in the absence of air or other oxidizing atmosphere, or moisture. Air, of course, presents a hazard where boron hydrides are involved. Moisture, on the other hand, presents a problem of hydrolysis of the product or the diborane, and also should be avoided where a metal such as sodium is present.

The reaction product obtained will hydrolyze, at least in part, even under mild hydrolysis conditions. For example, where the glycol ether used contains hydroxyl impurities, the reaction product hydrolyzes and contains less than 15 atomic weights of hydrogen per molecule, i.e. on an order of 13 H/molecule. This contingency can be minimized, if desired, by subjecting the glycol ether to a purification procedure designed to remove moisture, hydroxyl impurities such as residual uncombined glycol and the like, prior to reaction. A typical purification procedure involves distilling the ether over sodium hydride or sodium borohydride a plurality of times.

The hydrolysis sensitivity of the reaction product, while not desirable with respect to obtaining the reaction product with its full quota of hydrogen, is not without its advantages. Complete hydrolysis releases 16 mols of hydrogen per molecular composition of the reaction product. Partial, controlled hydrolysis can release a lesser amount of hydrogen and simultaneously provide a material capable of releasing less hydrogen per molecular composition than the original reaction product. Hence, if a product releasing, for example, 12 or 13 mols of hydrogen per unit weight is desired for a special application, the ease of partial hydrolysis of the present reaction product will facilitate that object and a product will be available that will produce the exact quantity of hydrogen desired upon subsequent complete hydrolysis.

The reaction products, even in impure form, are convenient portable sources of hydrogen. Considerable amounts of hydrogen are evolved upon simply heating with water. Where complete evolution of the active hydrogen is desired, it has been found advantageous to add dilute aqueous hydrogen chloride while warming slightly, or the product may be hydrolyzed with methanol. Complete hydrolysis of the reaction product yields 16 mols of hydrogen. An example of using the product as a reducing agent involves simply adding one of the products, e.g. solvated $Na_2B_5H_{15}$, to acetone, and then gently warming the mixture for a few minutes. In this fashion isopropanol can be produced. The fact that these compositions are reducing agents is readily apparent from the consideration that they contain substantial amounts of hydridic hydrogen. The products also are convenient portable sources of diborane. Diborane can be generated by heating at an elevated temperature. For example, upon heating 3.08 millimoles of $Na_2B_5H_{14.79}$ at 90° C. under vacuum, 1.16 millimoles of diborane were evolved.

The described ethers are essential as a reaction medium for this reaction to obtain the product, which is recovered as a solvate of the glycol ether. The useable ethers conform to the general formula $RO(C_2H_4O)_nR$, where $n$ is an integer from 1 to 4 and R is a lower alkyl radical. Representative glycol ethers are the mono-, di-, tri- and tetraethylene glycol dimethyl ethers. The reaction has been tested in simple ethers such as diethylether, and as a dry reaction but without obtaining the present reaction product. In other words, under these latter conditions, the resulting product does not have the alkali metal-boron ratio and the very high hydrogen contents of these products.

Sodium and potassium are used most conveniently as their respective amalgams for laboratory preparations or whenever the economics of large amounts of mercury are not objectionable. However, the use of a sodium or potassium dispersion is believed the best procedure for large scale process. The use of these alkali metals dispersed on a carrier such as sodium chloride is preferred when the product is to be used as an intermediate in the preparation of another material.

The invention will be described further in conjunction with the following specific examples. It should be understood that the examples are given by way of illustration and are not to be construed as limiting the invention.

EXAMPLE I

Sodium amalgam containing 6.70 millimoles of sodium was charged into a 150 ml. Pyrex tube. Then 11 millimoles of triethyleneglycol dimethyl ether, previously purified by successive distillations from above sodium hydride and sodium borohydride, were added to the reaction tube. Thereupon the tube contents were frozen and the space above the reactants evacuated. While still in the cold bath 12 millimoles of diborane were condensed into the frozen tube. Thereupon the tube was sealed off and warmed to room temperature. After reaction the tube was again frozen and opened. Excess glycol ether, unreacted diborane and any hydrogen present were removed and measured. The product was separated from the mercury and analyzed. It was found that all the sodium had reacted with 8.44 millimoles of the diborane charged. The composition of the product was $$Na_{2.0}B_{5.0}H_{14.6}$$

solvated with 3 molecules of the glycol ether.

EXAMPLE II

Using an identical reaction and analysis procedure to that of Example I, 6.16 millimoles of sodium in 11 millimoles of purified diethyleneglycol dimethylether were reacted with diborane present in excess. After 64 hours at room temperature, all the sodium was found to have reacted consuming 7.64 millimoles of the diborane. The product, solvated with the polyether, had an empirical composition of $Na_{2.00}B_{4.97}H_{14.8}$.

EXAMPLE III

Following the procedure set forth in Example I above, 5.72 millimoles of sodium and 11.64 millimoles of diborane were charged to the flask containing triethyleneglycol dimethylether. The ether in this instance was purified by a single distillation from sodium hydride. After 90 hours at room temperature, the tube was opened; 4.42 millimoles of diborane were recovered along with 3.01 millimoles of hydrogen which were evolved during reaction. The remaining solvated product, after removal of the mercury, had the composition $Na_{2.0}B_{5.05}H_{14.1}$. 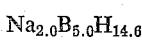
This product was heated with hydrogen chloride in aqueous solution whereupon 43.1 millimoles of hydrogen were evolved, making a total of 46.1 millimoles of hydrogen evolved during reaction and the subsequent hydrolysis. Since 45.7 millimoles would be expected from the complete hydrolysis of an equal amount of pure $Na_2B_5H_{15}$, these data were interpreted as indicating that $Na_2B_5H_{15}$ was the initial product of the reaction with the hydrogen content being subsequently reduced by a partial hydrolysis reaction.

EXAMPLE IV

A 125 ml. steel autoclave free from air and moisture was charged with 25 ml. of triethyleneglycoldimethylether and 25 ml. of sodium amalgam (containing 125 millimoles of sodium) to which was added 79.5 millimoles of diborane. The contents were stirred for 24 hours by rotating the autoclave. At the end of this time the reaction had occurred. After bleeding off the hydrogen formed, the autoclave was opened and the crude white solid product formed was separated from the mercury by decantation. This white solid was separated from the excess ether solvent by precipitation with diethylether and further purified by extraction with liquid ammonia. When the ammonia was evaporated, the reaction product in the form of its triethyleneglycoldimethyletherate was recovered. This product had the requisite sodium to boron ratio (2:5) and a high hydrogen content, though not the full 15 atoms.

EXAMPLE V

In this example a sodium dispersion was used in place of the sodium amalgam. In a 1 liter, 3-necked flask equipped with a dispersator, thermometer and air condenser there was placed 250 g. of mineral oil which was heated to 105° C. To this was added slowly 250 g. of sodium metal. After 15 minutes at maximum speed the agitator was stopped and the contents of the flask allowed to cool to room temperature. The mineral oil was removed by filtration, the sodium was washed with ethyl ether and 3 g. of this washed sodium was dispersed in 25 ml. of triethyleneglycoldimethylether. The slurry was placed in an autoclave and pressurized with 300 p.s.i. (141 millimoles) of diborane at room temperature. After stirring the contents for 24 hours, the hydrogen was removed and the contents treated with diethylether followed by extraction with liquid ammonia. About 9.3 g. of the solvated product (3 mols of the glycol ether) was recovered as a white crystalline solid.

EXAMPLE VI

In another method of preparation, highly reactive sodium dispersed on sodium chloride was reacted with diborane. In a 1 liter, 3-necked flask equipped with a dispersator, thermometer and air condenser there was placed 200 g. of finely ground dry sodium chloride. The sodium chloride was heated to 180° C. and 4.5 g. of metallic sodium was slowly added with vigorous stirring. This dry mixture was then cooled and dispersed in 170 ml. of triethyleneglycoldimethylether. To this dispersion was added 138 millimoles of diborane at room temperature. The slurry was allowed to stand overnight and the supernatant liquid decanted. This liquid was salted with diethylether and the solid formed was filtered off and extracted with liquid ammonia. A mixture of NaCl and the solvated reaction product was recovered (4.3 g.).

The identity of the products of this invention was established by X-ray and chemical analyses as well as by the stoichiometry of the reaction, the reproducibility of the reaction in successive experiments, and by the fact that the product obtained can be hydrolyzed with aqueous acid and with methanol. Some typical chemical analyses were as follows:

*Triethyleneglycoldimethyletherate* of $Na_2B_5H_{15}$ [1]

[Atomic ratios of elements in milligram atoms per gram]

| Element | Calculated | Found | | |
|---|---|---|---|---|
| Na | 3.1 | 3.2 | 2.9 | 3.1 |
| B | 7.7 | 7.7 | 7.2 | 7.7 |
| H [2] | 24.9 | 21.0 | 19.7 | 24.1 |
| Percent C | 44.4 | 44.4 | 45.7 | 44.9 |

[1] Solvated with three mols of the glycol ether.
[2] Millimoles of hydrogen released per gram of the solvate upon hydrolysis.

The correlation between the atomic ratios calculated and those actually found indicated the material was the triethyleneglycoldimethyletherate of $Na_2B_5H_{15}$ of very high purity.

In other experiments, $K_2B_5H_{15}$, as the solvate of the glycol ether used, was prepared by using potassium metal, either as an amalgam or as a dispersion, and reacting it with diborane in the same manner as that used for preparing $Na_2B_5H_{15}$. The product was identified by the same analytical techniques used to identify $Na_2B_5H_{15}$.

From the foregoing it is apparent that we have provided new reaction products containing sodium, or potassium, boron and active hydrogen wherein the alkali metal is present in an amount of 2 atomic weights for each five atomic weights of boron and the active hydrogen content is high and on the order of 15 atomic weights for each two of the alkali metal. These products are readily prepared in good yield and are convenient portable sources of diborane and hydrogen and are fine reducing agents.

According to the provisions of the patent statutes, we have explained the principle of our invention and have described what we now consider to represent its best embodiment. However, we desire to have it understood

We claim:

1. That method of preparing an alkali metal-diborane reaction product which comprises reacting an alkali metal selected from the group consisting of sodium and potassium with diborane in a glycolether having the formula $CH_3O(C_2H_4O)_nCH_3$ where $n$ is an integer from 1 to 3, and recovering the resultant product solvated with said glycolether and having the empirical composition represented by the formula $M_2B_5H_{15}$ in which M is an alkali metal selected from the class consisting of sodium and potassium.

2. A method according to claim 1 in which said ether is triethyleneglycoldimethylether.

3. A method according to claim 1 in which said alkali metal is used as an amalgam.

4. A composition of matter having the empirical formula $M_2B_5H_{15}$ where M is a metal selected from the group consisting of sodium and potassium, said composition of matter solvated with a glycolether having the formula $CH_3O(C_2H_4O)_nCH_3$ where $n$ is an integer from 1 to 3.

5. A composition of matter having the empirical formula $Na_2B_5H_{15}$ solvated with a glycolether having the formula $CH_3O(C_2H_4O)_nCH_3$ where $n$ is an integer from 1 to 3.

6. A composition of matter having the empirical formula $K_2B_5H_{15}$ solvated with a glycolether having the formula $CH_3O(C_2H_4O)_nCH_3$ where $n$ is an integer from 1 to 3.

References Cited in the file of this patent

UNITED STATES PATENTS

| | | |
|---|---|---|
| 2,544,472 | Schlesinger et al. | Mar. 6, 1951 |
| 2,921,963 | Baker et al. | Jan. 19, 1960 |
| 3,031,259 | Edwards et al. | Apr. 24, 1962 |

OTHER REFERENCES

Stock: "Hydrides of Boron and Silicon," 1933, pages 138–140.

Hough et al.: "Journal of the American Chemical Society," vol. 78, page 689 (1956).

Kasper et al.: "Journal of The American Chemical Society," vol. 71, page 2583 (1949).

Schechter et al.: "Boron Hydrides and Related Compounds," prepared under Contract NOa(s)10992 for Dept. of Navy, Bureau of Aeronautics, prepared by Callery Chemical Co., printed March 1951, Declassified December 1953, pages 10, 31.

Schlesinger et al. (II): "Hydrides and Borohydrides of Light Elements," NRL Report C–3147, August 1947, page 9 of Progress Report XXIV.

"Zur Kenntnis der Boransalze," by A. Stock et al., publ. in Zeitschrift fur anorganische und allgemeine Chemie., vol. 228 (1936), pp. 178–192.